United States Patent Office 3,479,187
Patented Nov. 18, 1969

3,479,187
PROCESS OF PREPARING A THIXOTROPIC
MILK SHAKE
Wendell S. Arbuckle, College Park, Md., assignor to
Charles W. Lease, Mount Airy, Md.
No Drawing. Filed Apr. 26, 1965, Ser. No. 451,066
Int. Cl. A23g 5/00
U.S. Cl. 99—60                                  9 Claims

ABSTRACT OF THE DISCLOSURE

A thixotropic milk shake composition is prepared by mixing fat, nonfat milk solids, 15 to 25% sweeteners and where the sweeteners contain at least 50% by weight of 6-carbon atom sugars, a stabilizer, and at least 66% water in a freezer with air, and whipping in the air to about 10 to 30% overrun.

---

This invention relates to a new pre-packaged food product, and more particularly to a new milk shake composition having thixotropic properties. Specifically, this invention relates to a new milk shake composition that can be stored, handled and vended, in a rigid state, but can be converted to a fluid state by simple agitation.

The ice cream confection known as the milk shake is well known and has been made in the past by mixing desired portions of fresh milk, ice cream or ice milk and flavoring together to provide a chilled, relatively aerated beverage adapted for immediate consumption. The milk shake, which is basically a homogenized oil-in-water emulsion, has been prepared more recently from basic milk and ice cream constituents including milk fat, milk-solids-non-fat (MSNF) or non-fat milk solids, sugar, flavoring material and an emulsifier and/or stabilizer, together with varying amounts of entrained air (overrun). With these ingredients, milk shakes can, and have been made with widely varying recipes to provide relatively thicker or thinner and richer or leaner beverage consistencies, as desired, to suit taste or economic demands.

While milk shakes are almost universally known and consumed, the availability of milk shakes to the public is limited by a common characteristic. That is, unlike ice cream and ice milk products, the milk shake has not been capable of vending to the public in the form in which it must be stored and handled. This is due of course to the nature of the product, since a milk shake is to be consumed as a liquid from a large, open-mouthed container or cup. The product is not amenable to packaging in this form however, and is desirably transported in bulk as a liquid, or in individual frozen units.

It is of course relatively easy to dispense liquid milk shake compositions from a commercial establishment, as it is easy to dispense soft ice cream and frozen custard "shakes." However, it is difficult to automatically dispense a milk shake formulation, either from bulk storage or in individual units, because the custard consistency which is necessary for handling and dispensing purposes is not the desired consistency for a milk shake. Further, the vending of liquid milk shakes is fraught with difficulties, and for this reason is practically entirely limited to manual vending. Vending of milk shakes is thus objectionable where economic conditions do not warrant the apparatus necessary for satisfactory liquid vending procedures.

Various attempts have been made in recent years to overcome this difficulty and provide milk shakes on a more widespread basis. Usually, the milk shake mix is simply packaged in individual cups and frozen solid during handling. If time and space permit, the product is stored at the vending establishment under carefully controlled conditions so that it may be warmed to the desired temperature and served. This is frequently objectionable because of the amount of freezer space required and the time consumed. Also, the product served to the consumer may be still quite hard and must be warmed and stirred before drinking. If warmed too much, or consumed too slowly, the product becomes thin, loses body appearance, frequently resulting in formation of large air bubbles.

It will thus be recognized that the availability of milk shakes is severely limited by large equipment demands. Further, there is an evident need in the art for an economical and satisfactory method of vending milk shakes in liquid form.

It is therefore a principal object of this invention to overcome the defects of prior art milk shake compositions and provide a milk shake product with properties such that the milk shake will be rigid during handling, but will become fluid with simple agitation.

It is another object of this invention to provide a procedure of processing and handling milk shake ingredients to provide a milk shake having excellent flavor, body, texture and palatability characteristics as well as excellent handling properties from the standpoint of automatic dispensing.

It is still another object of this invention to provide a milk shake composition that can be placed in a milk shake cup of desired size for consumption from automatic vending by the consumer over a period of many days after packaging.

It is a further object of this invention to provide a milk shake composition that will admit to convenience and economy in handling, storing and automatic dispensing in places and under circumstances wherein it has not been possible heretofore and without special mechanical devices to produce the proper fluidity for consumption.

It is still a further object of this invention to provide a combination of selected ingredients and formulation procedure therefor to provide a milk shake composition having exceptional and unusual thixotropic properties, resulting in unexpected characteristics including the ability to change back and forth from a firm product without agitation to a fluid slush with slight agitation.

Ancillary to the preceding object, it is an object of this invention to provide selected ingredients and a formulation procedure therefor, resulting in a milk shake composition having desirable refreshing coldness, smoothness of product, sweetness, consistency and appearance required for excellent palatability.

Other and further objects of this invention, together with an appreciation for the advantages thereof, will become increasingly apparent as this description proceeds.

Surprisingly, the foregoing problems are solved, the foregoing objects are achieved, and important advantages are realized according to the invention, by providing a combination of ingredients and formulation procedure therefor, resulting in a milk shake composition which is "thixotropic" in nature. When the composition of the invention is relatively unagitated, there is a consistency close to that of frozen custard. But, when stirred, as with a straw in a paper cup, or by simple shaking, the viscosity is greatly changed and the composition takes on the characteristics of an easy flowing fluid and can, accordingly, then be sucked up through the straw.

The success of the invention lies both in the ingredients selected for the milk shake formulation, and in a controlled procedure of processing and handling which results in a milk shake with excellent flavor, body and texture and palatability characteristics, as well as in excellent handling properties, making it well adapted for dispensing from automatic vending equipment.

The formulation is such that the milk shake can be prepared and placed in a milk shake cup of desired size for storage in automatic vending equipment over a period of many days after packaging, followed by successful vending and consumption by the purchaser. The ingredients used in the formulation according to the invention are generally known for milk shake formulations. Some of these ingredients are used in amounts that may lie within the usual range of composition for milk shakes. However, the novelty of the invention resides first in the selection of particular ingredients, combined in particular amounts, that lead to a hitherto unexpected thixotropic property. The invention is also keyed to a novel mixing procedure, which in combination with the selection and amounts of ingredients, influence the thixotropic properties of the product in the temperature ranges where the product is consumed.

The type of ingredients and nature of blend of these ingredients maintain the palatable characteristics and consistency of the milk shake composition according to the invention, for prolonged handling and storage periods when the production and processing procedures herein specified are employed. These procedures provide for convenience and economical handling, storing and dispensing of the present milk shakes automatically and in places which have not been susceptible of such use heretofore without special mechanical devices for producing the proper fluidity for consumption.

In more detail, the formulation according to the invention will include milk and/or cream or milk fat; non-fat milk solids, sometimes referred to as "milk solids non-fat" or MSNF; sugars or sweeteners; various stabilizers; water to make up desired fluidity; entrained air as overrun; and flavoring, combined in amounts and under conditions hereinafter discussed in detail to provide the surprising thixotropic properties above referred to.

It is known that the milk fat contributes a richness of flavor and also improved texture and assists in obtaining a desirable body. The nonfat milk solids contribute to whipping characteristics, and also to body and flavor. The sugars sweeten the composition to taste and, together with the lactose and salt content of the nonfat milk solids, tend to lower the freezing point of the mix and tend to contribute to the consistency and other desirable qualities of palatability. The stabilizer increases the stability of the emulsion and helps to bind the water content of the mix and stabilize the tendency toward churning in the freezer.

The stabilizers are selected to provide a firm consistency that will not interfere with the desired change to a fluid state upon reasonable agitation. The stabilizer essentially forms a mechanical matrix of molecules, adding to the thickness, and preventing separation of particles of the mix, thereby maintaining homogeneity and contributing to the thixotropic properties herein described. Gelatin and animal proteins are especially preferred for their water binding capacity. Other stabilizers, such as a vegetable gum, may also be found suitable through their ability to induce the formation of ice crystals and yet maintain sufficient smallness of size such that their presence in ice cream will not be felt on the tongue during freezing, handling and storage of ice cream.

Other known stabilizers that may find supplemental use herein may be selected from sodium alginate, Irish moss, egg white, locust bean gum, gum acacia, the alginates, carob gum, gum karaya, gum tragacanth, agar agar and carboxymethyl cellulose and the sodium salt thereof.

As is understood in the art, the terms "milk solids-non-fat" or "nonfat milk solids" used herein, generically refer to all milk solids other than milk fat present in the milk, such as the solids in skim milk, including milk protein (casein, lactalbumin and lactoglobulin), lactose, pigments, inorganic salts, as well as minor organic constituents, such as phospholipids and cholesterol. The term "milk serum solids" has also been used in the literature to refer to milk solids-non-fat. The invention contemplates milk solids-non-fat contained in whole milk and skim milk, and also those derived from other milk products. As the milk product furnishing fat and/or milk solids-non-fat there can be used whole milk, cream, superheated condensed skim milk, condensed whole milk, sweetened condensed skim milk, evaporated milk, butter, butter oil, dried milk, frozen milk, frozen cream, plastic cream, condensed skim milk, skim milk powder and fluid skim milk.

The sweetener employed according to the invention is usually a combination of known sugars for reasons to become apparent hereinafter. It is preferred to use 6-carbon sugars such as detxrose and fructose, in combination with some sucrose, a twelve carbon sugar. As the source of the sugars there can be used invert sugar, syrup, corn sugar, both liquid and dry preparations, brown sugar, maple sugar and syrup, honey, molasses, sucrose and dextrose. The freezing point of the present composition is lowered, as is explained hereinafter, by the use of such sweeteners as dextrose and fructose, singly, or in various combinations together, or in combination with sucrose, to get the desired fluidity as well as the desired sweetness.

As with other ice cream and milk shake confections, the composition of the present invention is prepared by mixing the ingredients in a freezer while air is whipped into the mass to the desired overrun to give a fine-grained, palatable product. Controlling the freezing procedure to an optimum overrun is important.

Overrun is the increase in volume resulting from the amount of air incorporated into the mix during the agitation and freezing process. It is generally expressed as percentage overrun and is desired both for economy and texture. As is known in the art, the amount of overrun is controlled in the freezer. If too little air is incorporated, the product will lack the desired body, but if too much air is incorporated, the mix becomes too frothy and lacks body. This may occur as a result of prolonged agitation at too high a temperature.

The size of the air cells introduced is also of importance, since the smaller air cells are associated with a finer texture. Here too the emulsifier plays a part, contributing to the attainment of the desired overrun while maintaining a fine texture in the finished mix. Ordinarily, ice cream products contains from 40 to 100% overrun, and even higher. According to the invention however, overrun is desirably controlled to fall in the range of only 10 to 30%. Lower than 20% overrun is desirable, and about 15% is especially preferred.

As already pointed out, the composition of this invention is surprisingly thixotropic, i.e., a fluid body having an apparent viscosity which decreases with time to some minimum value at any constant rate of shear, for example, a few shakes, or stirring with a straw. When the shearing stress is removed, the apparent viscosity increases with time to the original value at no shear. The consistency of such a material can be considered as a function of its past history.

The thixotropic property is achieved through the present combination of ingredients, in amounts and under conditions herein indicated. With overrun in the range above indicated, and temperature as given hereinafter, it is desired to have a fat content in the range of 2 to 8%, while about 3% is preferred. The nonfat milk solids may lie in the range of 8 to 16%, while about 12% is preferred. Typically, the amount of fat and nonfat milk solids will vary inversely, high fat content necessitating low MSNF, and vice versa. Sweeteners may comprise from 15 to 25%, although about 18% is preferred. The stabilizer can range from 0.2 to 0.8%, preferably about 0.4%. Water will make up the balance, and is preferably at least about 66% such that total solids will range from a maximum of about 34% to about 31%, although it may reach as low as about 25% at a minimum. Flavoring may then be added, as desired.

It is an important feature of the invention that the sweeteners comprise a mixture of sugars, preferably at least 50% of the total sugar content being a 6-carbon sugar, with from 0 to 50% of the balance as sucrose, preferably at most about 25% sucrose. In some instances, where greater sweetness is desired, more than 50% sucrose can be employed. The high percentage of 6-carbon sugar is an advantage, as twice as many molecules are available per sweetening unit to effect greater freezing point depression. The combination of sugars according to the invention, in depressing the freezing point, also assures the obtaining of smaller size ice crystals which prevents solid freezing and is believed to be desirable at least for reasons of texture and palatability. Further, the 6-carbon sugars provide greater solids content in the mix, improving body and texture. If sucrose is present, the total sugar content must then be reduced to maintain an acceptable sweetness level. Use of sucrose is sometimes an advantage when it is desired to maintain sweetness and lower solids content.

In combination with the selection and amount of ingredients, temperature is also a factor in achieving the desired thixotropic property, as the temperature bears on both the freezing point of the ingredients and on refreshing qualities. Serving the milk shake at a temperature of 20° F. is most preferred for refreshing palatability and the preferred formula has the desired properties at this temperature. Other temperatures will be found suitable, however, depending on the season, local custom and taste. Thus, storage and vending may take place at about 15° F. to about 25° F. whereat the composition is "rigid." Storage may also take place at much lower temperatures, for example at 0° F. or minus 10° F., whereat the composition may become frozen solid.

The term "rigid" as used herein does not refer to a hard frozen solid state, but to a condition where the product is nonflowable of its own weight or by gravity to the extent that is less flowable than a "thick" or "viscous" milk shake. Hence, the product can be turned on its side or end without danger of spilling. Without agitation, and in the range of temperatures above indicated, the present composition, in absence of agitation, will become firm and stay rigid. Agitation will then turn the product fluid, so that it may be consumed.

The fluidity desired is that which is sufficient to draw the composition through an average diameter (about 3/16 or 1/4 inch) milk shake straw with comparative ease. With relatively little agitation, the product will resemble a flowable, smooth "slush" having very small ice crystals. The agitation desired for fluidity will usually be from one to about three manual shakes, as one would shake a carton of chocolate milk. This will be sufficient to turn the product from its rigid form into a slush capable of being drawn through a straw. Several turns with a straw will also suffice. Because the shaking is not severe, the product may be stored and dispensed in ordinary milk shake cups fitted with a simple closure, of the stiff plastic cup, cardboard disc or other variety, thus permitting great ease of handling. The expedient of leaving head space in the package permits mild agitation and affords a means of producing the amount of fluidity desired for palatability.

It is important to the body, texture and smoothness that consideration be given to the ice crystal size. In a sense, the thixotropic property of this composition is keyed to the size of the ice crystal. If too large an ice crystal forms, as during static freezing, the product can become more frozen, as is the case with conventional milk shakes. Desirably, smaller size ice crystals are obtained, according to the invention, through the combined influence of the ingredients, and by agitation during freezing.

Typically, the composition of the invention is made by charging the ingredients, via a mixing pump, into a freezer equipped with a cooling jacket and several impeller blades and scrapers. An air pump is used to introduce air into the freezer so that the motion of the impeller blades will whip in the air as overrun in the proportion of 10 to 30%. Ice crystals are formed during the mixing process.

When the desired overrun is reached, the mix is delivered as a liquid, semi-frozen slush which is then metered into the desired milk shake containers, followed by application of suitable closures. The product can be stored, for example in a vending machine, at 15° F. to 25° F. The product becomes "rigid" during storage. On removal from a vending machine at about 20° F., three shakes or so will make the rigid product turn into a slush capable of being drawn through a straw.

Understanding of this invention will now be facilitated by reference to the following examples. These examples are to be considered as illustrative, rather than limiting, on the invention.

The following procedure was observed in all examples:

(1) Blend in vat all ingredients in amounts set forth in the examples.

(2) Pasteurize and homogenize the blend of ingredients, cool to 40° F. and mix. The mix may or may not be aged.

(3) Flavor with vanilla or other flavor as desired.

(4) Freeze milk shake mix in a carefully controlled freezer to approximately 18 to 20° F., controlling overrun to approximately 15% or other percentage desired.

(5) Package the frozen milk shake in cups filled 3/4 to one inch from top, cover and place in automatic or other vending equipment refrigerated at 18 to 20° F. for immediate vending or indefinite storage.

The cups may be placed in refrigerated storage at 0 to −20° F. to harden for an indefinite time for later transportation to distribution centers, then tempered to 20° F. for consumption from automatic or other vending equipment.

(6) The milk shake may be stored in the covered cup at 20° F. or 0 to −20° F. for 4 to 6 weeks or longer and maintain palatable qualities.

(7) The milk shake cup may be removed from the vending apparatus by the consumer and given mild agitation, such as, two or three shakes upward and downward through a distance of about 12 inches to bring the milk shake from a rigid state to a palatable, flowable condition so it can be drawn through a straw when the lid of the cup is removed.

Formulae and examples of the compositions of the present invention, produced according to the above method, are as follows:

EXAMPLE 1

|  | Parts |
|---|---|
| Milk—4% fat | 300 |
| Nonfat dry milk—97% MSNF | 30 |
| Dextrose | 80 |
| Stabilizer | 2 |
| Vanilla extract | 1.5 |

EXAMPLE 2

|  | Parts |
|---|---|
| Cream—40% | 45 |
| Nonfat dry milk—97% MSNF | 53 |
| Dextrose | 80 |
| Water | 270 |
| Stabilizer | 2 |
| Vanilla extract | 1.5 |

EXAMPLE 3

|  | Parts |
|---|---|
| Cream—40% | 45 |
| Condensed skim milk—28% MSNF | 182 |
| Dextrose | 80 |
| Water | 140 |
| Stabilizer | 2 |
| Vanilla extract | 1.5 |

Flavors other than vanilla may be added at the desired rate.

EXAMPLE 4

With reference to Examples 1, 2 and 3, it is to be understood that the dextrose sweetener may be replaced by various combinations of sweeteners that are suitable according to the invention. The following are typical of the number of ways in which the sweetener combination can be altered to vary the pseudoplasticity of the mix, as well as the sweetness. The reason for this is not fully comprehended but seems to depend in part on the sweetening unit of each particular sugar, together with the increase or decrease of total solids provided therewith. The amount is calculated on a basis of eighty parts by weight total sweetener content. It is understood of course that the invention is not limited simply to the following proportions or combinations:

(a)

| | Parts |
|---|---|
| Dextrose | 60 |
| Sucrose | 20 |

(b)

| | |
|---|---|
| Dextrose | 40 |
| Sucrose | 40 |

(c)

| | |
|---|---|
| Dextrose | 20 |
| Sucrose | 60 |

(d)

| | |
|---|---|
| Fructose | 60 |
| Sucrose | 20 |

(e)

| | |
|---|---|
| Fructose | 40 |
| Sucrose | 40 |

(f)

| | |
|---|---|
| Fructose | 20 |
| Sucrose | 60 |

(g)

| | |
|---|---|
| Frustose | 80 |

(h)

| | |
|---|---|
| Dextrose | 30 |
| Fructose | 30 |
| Sucrose | 20 |

(i)

| | |
|---|---|
| Dextrose | 20 |
| Fructose | 20 |
| Sucrose | 40 |

(j)

| | |
|---|---|
| Dextrose | 10 |
| Fructose | 10 |
| Sucrose | 60 |

(k)

| | |
|---|---|
| Invert sugar | 40 |
| Dextrose | 40 |

As will be recognized, the invention has achieved the desired objectives in a surprising manner through selection of ingredients, order of magnitude of solids content, selection of stabilizer and amount of overrun to give a rigid or slushy thioxtropic mix in the vicinity of 20° F. The combination and kind of ingredients selected impart exceptional and unusual thioxtropic properties which result in unexpected characteristics. The product changes back and forth from a firm product, without agitation, to a fluid slush with slight agitation. The desired coldness, smoothness of product, sweetness, consistency and appearance are provided by the formula and controlled processing and handling apparatus.

It will therefore be understood that while the foregoing invention has been described in some detail, the specific examples are only presented by way of illustration and for the purpose of clarity and understanding. Accordingly, certain changes and modifications evident to those skilled in the art may be practiced within the spirit of the invention and it will be understod that the invention is not to be limited, except as set forth in the following claims.

What is claimed is:

1. A process for preparing a thixotropic milk shake composition comprising the steps of mixing about 2 to 8% fat, about 8 to 16% nonfat milk solids, about 15 to 25% sweeteners and where the sweeteners contain at least 50% by weight of 6-carbon atom sugars, about 0.2 to 0.8% stabilizer, and at least about 66% water in a freezer with air, whipping in the air to about 10 to 30% overrun, metering the mix into milk shake containers, followed by storage at a temperature of about 10 to 25° F., said composition exhibiting thixotropic properties at a temperature in the range of about 15 to 25° F.

2. The process of claim 1 wherein the sweeteners contain up to 50% sucrose.

3. The process of claim 1 wherein the sweeteners contain at most about 25% sucrose.

4. The process of claim 1 wherein the proportion of nonfat milk solids varies inversely with the proportion of fat.

5. The process of claim 1 having therein about 3% fat, about 12% nonfat milk solids, about 18% sweeteners, about 0.4% stabilizer, water making up the balance, 15% overrun, and flavoring to suit taste.

6. The process of claim 1 wherein the temperature of storage is about 20° F.

7. The process of claim 1 wherein the overrun is about 15%.

8. The process of claim 1 wherein the stabilizer is selected from gelatin and animal proteins.

9. The process of claim 1 wherein the six carbon sugar is selected from dextrose, fructose and maltose.

References Cited

UNITED STATES PATENTS

| 2,507,482 | 5/1950 | Scott | 99—28 X |
| 3,061,443 | 10/1962 | McLaughlin | 99—137 |
| 3,084,052 | 4/1963 | McLaughlin | 99—60 X |

OTHER REFERENCES

Frandsen et al.: Ice Cream and Related Products, The AVI Pub. Co., Inc., Westport, Conn., 1961, pp. 178 and 196.

RAYMOND N. JONES, Primary Examiner

D. M. NAFF, Assistant Examiner

U.S. Cl. X.R.

99—28, 136